United States Patent
Heller, Jr.

(10) Patent No.: US 8,417,974 B2
(45) Date of Patent: Apr. 9, 2013

(54) POWER EFFICIENT STACK OF MULTICORE MICROPROCESSORS

(75) Inventor: Thomas J. Heller, Jr., Rhinebeck, NY (US)

(73) Assignee: International Business Machines Corporation, Armonk, NY (US)

(*) Notice: Subject to any disclaimer, the term of this patent is extended or adjusted under 35 U.S.C. 154(b) by 565 days.

(21) Appl. No.: 12/619,052

(22) Filed: Nov. 16, 2009

(65) Prior Publication Data

US 2011/0119508 A1    May 19, 2011

(51) Int. Cl.
*G06F 1/32* (2006.01)

(52) U.S. Cl.
USPC ............. 713/320; 257/686; 711/141; 712/31

(58) Field of Classification Search ............... 257/686; 711/141; 712/31; 713/320
See application file for complete search history.

(56) References Cited

U.S. PATENT DOCUMENTS

| | | | |
|---|---|---|---|
| 5,963,464 A | 10/1999 | Dell et al. | |
| 6,271,587 B1 | 8/2001 | Patti | |
| 6,362,974 B1 | 3/2002 | Lettang | |
| 6,376,909 B1 | 4/2002 | Forbes et al. | |
| 6,376,914 B2 | 4/2002 | Kovats et al. | |
| 6,611,052 B2 | 8/2003 | Poo et al. | |
| 7,046,522 B2 | 5/2006 | Sung et al. | |
| 7,098,541 B2 | 8/2006 | Adelmann | |
| 7,272,741 B2 * | 9/2007 | Wilcox et al. | 713/503 |
| 7,432,599 B2 | 10/2008 | Verma et al. | |
| 7,518,225 B2 | 4/2009 | Emma et al. | |
| 7,774,549 B2 * | 8/2010 | Vishin | 711/133 |
| 2007/0069389 A1 | 3/2007 | Wollanke et al. | |

FOREIGN PATENT DOCUMENTS

| | | |
|---|---|---|
| CN | 1175735 | 3/1998 |
| CN | 1311898 | 9/2001 |
| CN | 1707400 | 12/2005 |

OTHER PUBLICATIONS

Low-Power Approaches for Parallel, Free-Space Photonic Interconnects, Carson et al., Sandia National Laboratories, SAND-95-2845C; CONF-960153-1, 1995.
Picoserver: Using 3D Stacking Technology to Enable a Compact Energy Efficient Chip Multiprocessor, Kgil et al, Operating Systems Review, v 40, n 5, 117-28, Date: Dec. 2006.
Challenges in Stacked CSP Packaging Technology, Boon et al., 2006 8th International Conference on Electronic Materials and Packaging—EMAP '06, 2007, 444-7, Date: Dec. 2006.

(Continued)

*Primary Examiner* — Albert Wang
(74) *Attorney, Agent, or Firm* — John E. Campbell

(57) ABSTRACT

A computing system has a stack of microprocessor chips that are designed to work together in a multiprocessor system. The chips are interconnected with 3D through vias, or alternatively by compatible package carriers having the interconnections, while logically the chips in the stack are interconnected via specialized cache coherent interconnections. All of the chips in the stack use the same logical chip design, even though they can be easily personalized by setting specialized latches on the chips. One or more of the individual microprocessor chips utilized in the stack are implemented in a silicon process that is optimized for high performance while others are implemented in a silicon process that is optimized for power consumption i.e. for the best performance per Watt of electrical power consumed. The hypervisor or operating system controls the utilization of individual chips of a stack.

18 Claims, 4 Drawing Sheets

OTHER PUBLICATIONS

3-D Silicon Integration and Silicon Packaging Technology Using Silicon Through-Vias, Knickerbocker et al., IEEE Journal of Solid-State Circuits, V 41, N8, Aug. 2006, p. 1718-1725, ISSN: 0018-9200.

"Is 3D chip technology the next growth engine for performance improvement?", Emma et al., IBM Journal of Research and Development, vol. 52, No. 6, 2008, (G322-0257-00), pp. 541-552.

"Three-dimensional silicon integration", Knickerbocker et al., IBM Journal of Research and Development, vol. 52, No. 6, 2008, (G322-0257-00), pp. 553-569.

"Fabrication and characterization of robust through-silicon vias for silicon-carrier applications", Andry et al., IBM Journal of Research and Development, vol. 52, No. 6, 2008, (G322-0257-00), pp. 571-581.

"Wafer-level 3D integration technology", Koester et al., IBM Journal of Research and Development, vol. 52, No. 6, 2008, (G322-0257-00), pp. 583-597.

"3D chip stacking with C4 technology", Dang et al., IBM Journal of Research and Development, vol. 52, No. 6, 2008, (G322-0257-00), pp. 599-609.

"3D chip-stacking technology with through-silicon vias and low-volume lead-free interconnections", Sakuma et al., IBM Journal of Research and Development, vol. 52, No. 6, 2008, (G322-0257-00), pp. 611-622.

* cited by examiner

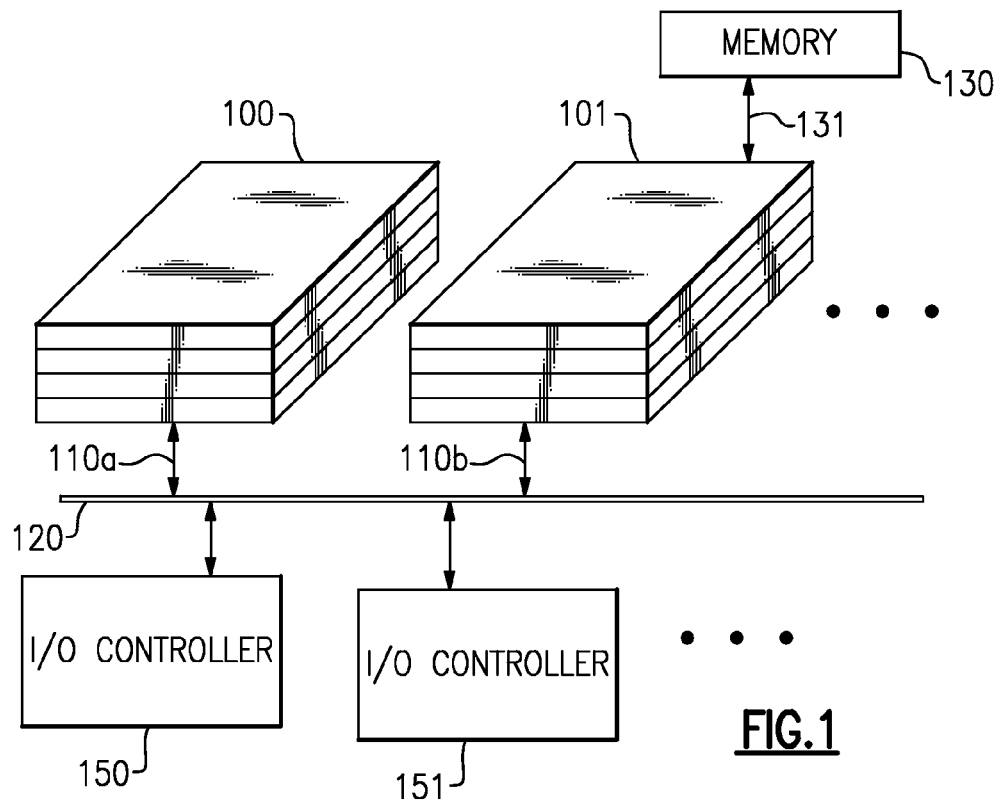
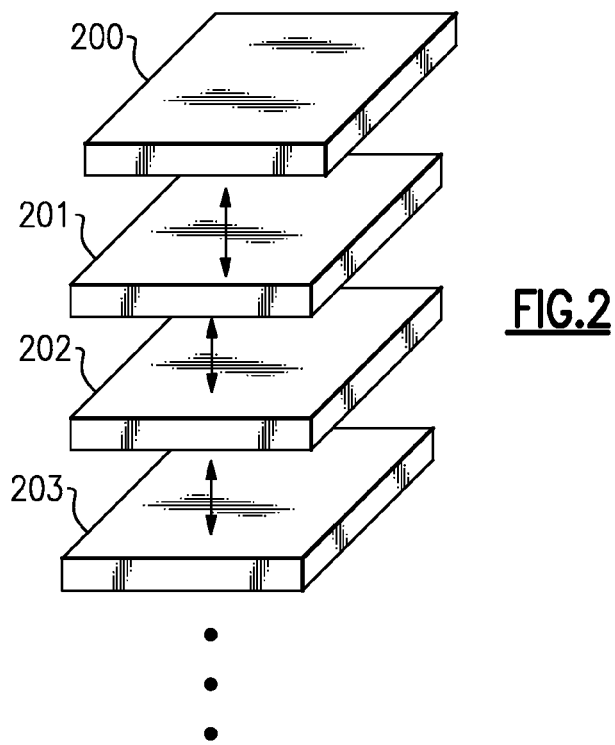

US 8,417,974 B2

POWER EFFICIENT STACK OF MULTICORE MICROPROCESSORS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer systems and in particular to multiprocessor computer systems formed from a group of chips arranged in a stack with facility to achieve increased performance per watt of power consumed while providing high performance speed.

2. Description of Background

Current multiprocessor computing systems use a variety of methods to achieve high performance while using a moderate amount of electrical power. Generally in the art circuit and device selections are made so that high performance devices are used on the longest logic paths. Clock gating has been widely used to limit the AC power consumed by logic that is lightly utilized. Power gating has been used to shut off all power to components that are temporarily unused.

Voltage scaling also has been widely used to provide a variety of power performance operating points for a single microprocessor chip. Prior-art systems have used voltage scaling of the microprocessor core in order to reduce AC power during periods of low processor utilization by reducing the supply voltage.

SUMMARY OF THE INVENTION

With our solution a wider range of voltage scaling can be provided, and as much computing power in the smallest area possible given a fixed electrical and thermal limit is provided. The shortcomings of the prior art are overcome and additional advantages are provided through the provision of a computing system which uses a stack of microprocessor chips that are designed to work together in a multiprocessor system. The invention works to increase the maximum throughput of a computing server at a given power level and within a given physical footprint for packaging of the system. The chips in the stack are interconnected via specialized cache coherent interconnections. All of the chips in the stack use the same logical chip design, even though they can be easily personalized by setting specialized latches on the chips. One or more of the individual microprocessor chips utilized in the stack are implemented in a silicon process that is optimized for high performance while others are implemented in a silicon process that is optimized for power consumption, i.e. for the best performance per Watt of electrical power consumed.

The invention is designed to work with any suitable hypervisor or operating system dispatching algorithms that have been optimized to maximize power performance. These power performance optimizations will result in the need to move the execution of processes between the high performance cores and the power performance cores.

The invention uses a data cache structure that works to minimize the negative performance impact of moving the dispatch of workloads between the microprocessor cores in the high performance chips in the stacks and the power performance cores in the other chips. The new data cache is shared among all of the cores in a stack of chips and can be kept coherent with all other caches in the system. The physical structure of the chip stack allows for very wide data busses between the chips in the stack. The current embodiment of our invention uses such wide data busses to quickly move data to the optimal physical data cache array when it is found to be in a less optimal position. This design provides optimal data placement within the chip stack.

TECHNICAL EFFECTS

As a result of the summarized invention, technically we have achieved a solution which is also an improvement over existing computing server designs. It allows a single microprocessor chip design to be replicated and used in a group to achieve increased performance per watt of power consumed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates our computing system using a stack of microprocessors showing schematically how a stack of multiprocessor microprocessors can be connected together to provide a large computing server.

FIG. 2 illustrates our stack of microprocessors in more detail with its multiprocessor chips packaged together.

Figure 3:
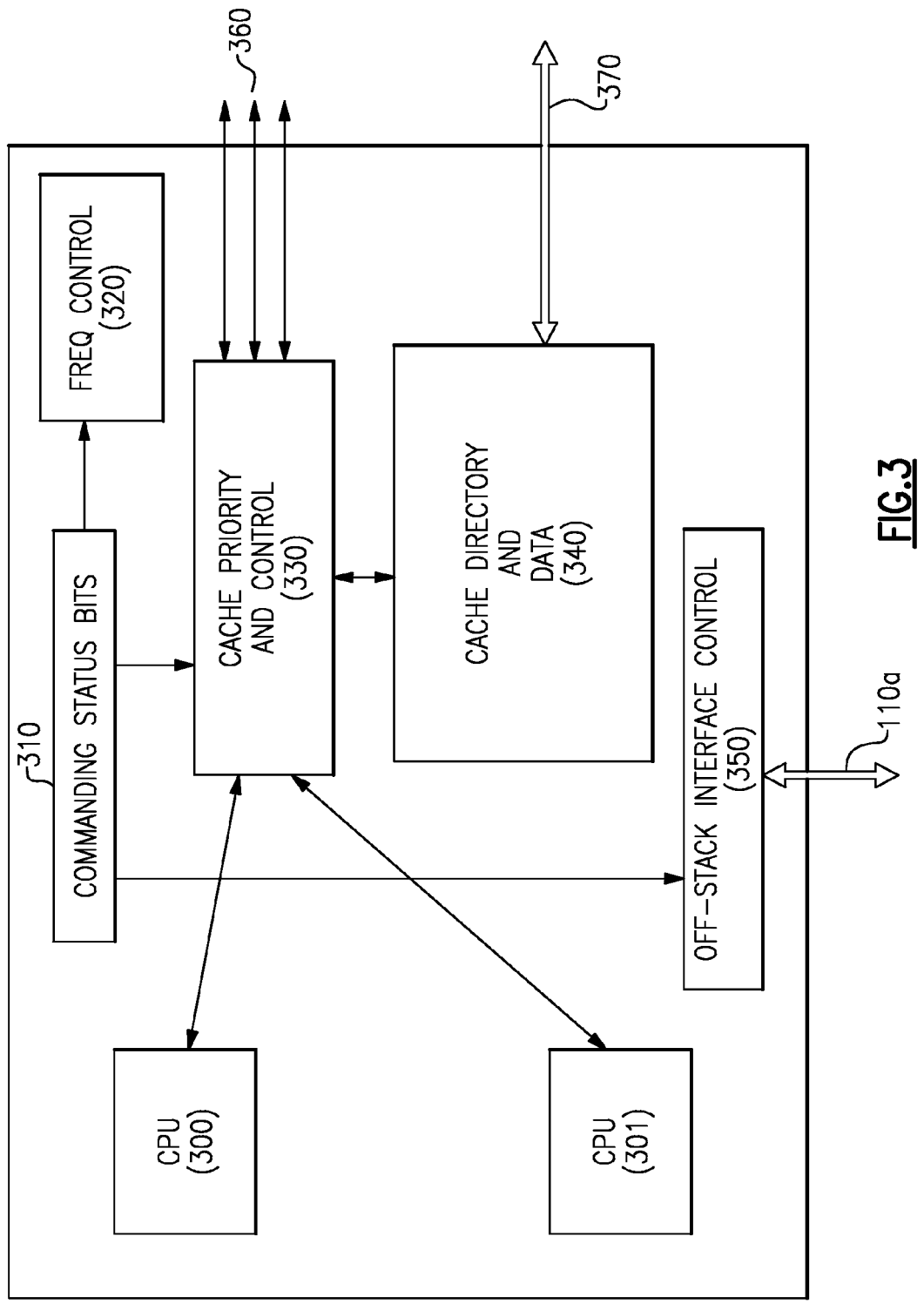
FIG. 3 shows a detailed view of our microprocessor chip.

The detailed description explains the preferred embodiments of the invention, together with advantages and features, by way of example with reference to the drawings.

DETAILED DESCRIPTION OF THE INVENTION

FIG. 1 shows schematically how a stack (100) of multiprocessor microprocessors can be connected together to provide a large computing server, in a system structure which includes multiple stacks (100,101). The preferred embodiment of the invention uses a system structure that includes direct interconnection of the chips of a stack but any other interconnection can be used, such as the carrier package stack with its interconnections for a multi-layer stack (illustrated as memory chips) described in U.S. Pat. No. 7,518,225, Chip System Architecture for Performance Enhancement, Power Reduction and Cost Reduction, Inventors, Philip G. Emma, et al, assigned to IBM®, the Assignee hereof and incorporated herein fully by reference. Stacks of microprocessor chips (100,101) are connected to a system bus (120) via a cache coherent link (110a,110b). I/O controllers (150,151) are also connected to the system bus (120). Any number of other devices found in prior-art computing systems may also be connected to the system bus (120) via a suitable interface. The additional devices may include memory controllers, communication controllers, co-processors and the like. A microprocessor stack (101) can be also connected directly to a set of DRAM chips that provide a portion of system memory (130) via a typical memory bus (131) as is illustrated in the preferred embodiment of FIG. 1. Additional memory interfaces may be added to other stacks or directly to the system bus (120).

FIG. 2 shows the stack of microprocessors in more detail. Multiprocessor chips (200,201,202,203) are packaged together in the preferred embodiment in the stack which is shown oriented in parallel 3D with the use of through silicon vias as described in the IBM Journal of Research and Development Volume 52, Number 6 pages 541 to 622, of 2008, which is fully incorporated herein by reference, providing a physically compact stack using the 3D chip stacking with through silicon vias (as there described). The stack of chips (200,201,202,203) itself can be attached to the next level package using any number of prior-art chip mounting technologies including direct chip attach (DCA), or, alternatively, each chip can be mounted in its own packaging carrier as a set with one of the packaging carriers mounted on the next level package as illustrated in the above referenced U.S. Pat. No. 7,518,225.

In the preferred embodiment microprocessor chip 200 of the stack 100 is implemented in a silicon process that provides high performance optimization at the cost of increase electrical power consumption. This optimization can be attained in any number of ways including changes in doping levels, changes in gate oxide thickness, changes in gate oxide materials etc. The other chips in the stack 100, such as chips 201, 202, 203 are implemented in a silicon process that provides excellent power performance to provide low power consumption optimization via changes in the same parameters. Other embodiments may use a different ratio of high performance chips to power optimized chips. For example, 200 and 201 could be implemented in the high performance process, only one of which will be a "command chip" and the rest in the power performance optimized process. Any number of total chips in the stack could be used.

All the chips in the stack are logically equivalent even though they differ in high performance optimization and power consumption. The chips are designed to operate at a wide range of possible frequencies and clock frequency controls over the setting of the frequency for each of the chip are used. Other embodiments may use chips that are nearly logical equivalents and still obtain many of the low cost benefits of the invention. This stack provides a computing system which uses a stack of microprocessor chips that are designed to work together in a multiprocessor system. The interconnection speed works to increase the maximum throughput of a computing server at a given power level and within a given physical footprint for packaging of the system. The chips in the stack are interconnected via specialized cache coherent interconnections provided in the exemplary embodiment by the connections for cache coherence between the stacks of chips in the preferred embodiment with the controllers for these specialized interconnections on the chips within each of the stacks, and all of the chips in the stack use the same logical chip design, even though they can be easily personalized by setting specialized latches on the chips. One or more of the individual microprocessor chips utilized in the stack are implemented in a silicon process that is optimized for high performance while others are implemented in a silicon process that is optimized for power consumption, i.e. for the best performance per Watt of electrical power consumed.

FIG. 3 is a detailed view of our microprocessor chip (a chip, 200, in stack 101 is illustrated by all of FIG. 3). All of the chips in the stack have the same logical blocks. The preferred embodiment, the chip 200 of FIG. 3 includes 2 processor cores (300,301), a cache controller (330), and a cache directory (340). The chip also includes a set of commanding status bits (310) which are written during the power on sequence of the system. System software identifies one chip (200) in the stack 101 to be the "command" chip and the commanding status bits for that chip are written with a code of '11'. The commanding status bits of all the other chips in the stack 101 are written with a '00'. The microprocessor chip (200 in stack 101) may have many other off chip interfaces that are not shown. These interfaces are used to directly connect memory DIMMs, I/O devices, co-processors or any other devices that are found in prior-art computing systems. These other interfaces may be used by just one chip in the stack or by all of the chips in the stack.

The off-stack interface control (350) shown in FIG. 3 is used to communicate with the other stacks of chips in the computing system via a suitable interface (110a). The logic for this off-stack communication function is included in all the chips of the stack but only enabled in the command chip of the stack.

Chip 201 of stack 101 also includes a frequency control unit (320) that controls the clock frequency for the various components of the chip. This unit uses the setting of the commanding status bits as an input. A setting of '11' indicates that the frequency control should set the chip frequency at the high end of the operating range in order to obtain the highest possible performance for the high performance optimization chip. A setting of '00' indicates that the frequency should be set to a lower, power efficient setting.

Figure 4:
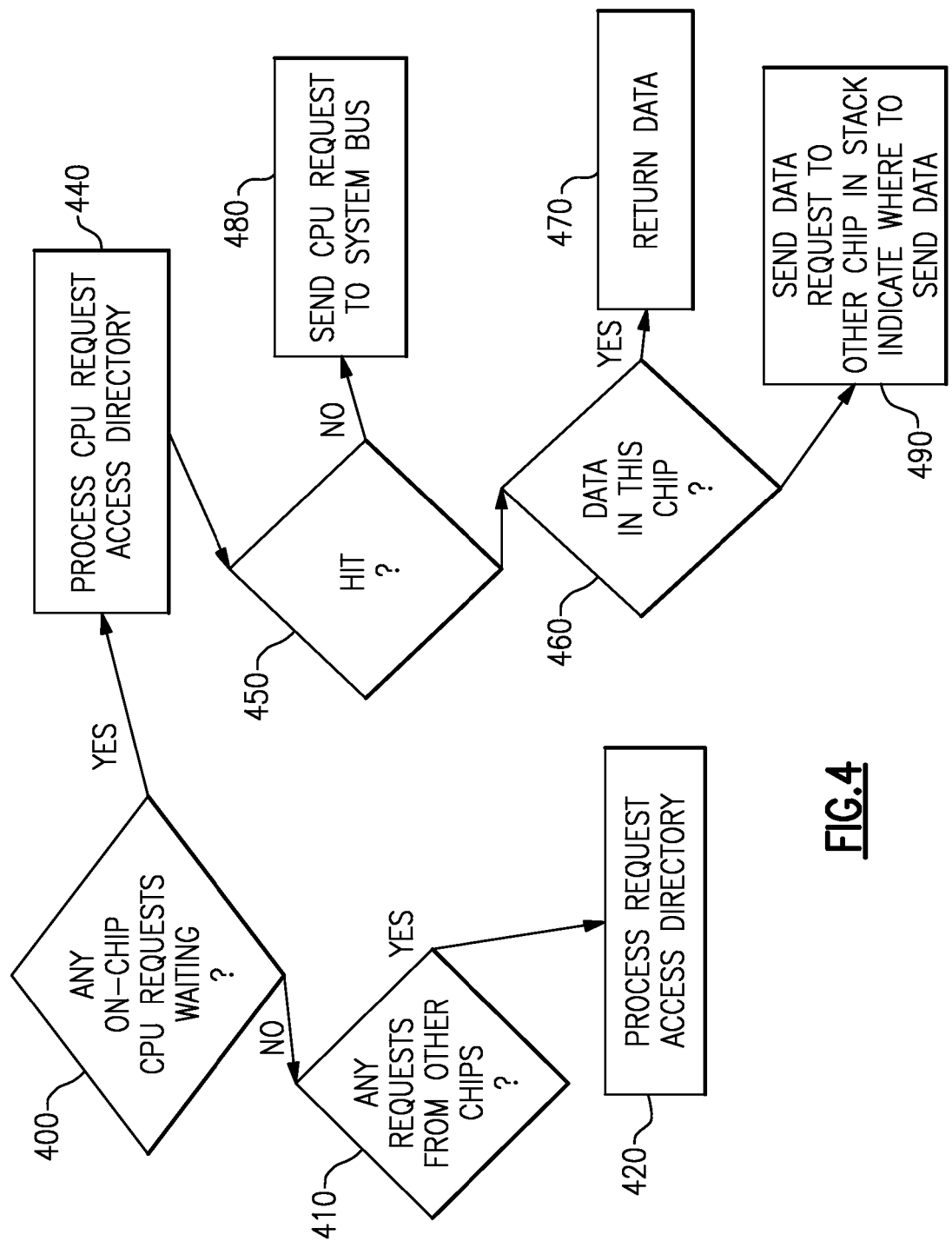
FIG. 4 shows is a flowchart that shows how the treatment of cache misses is different for the high performance command chip compared to the other chips in the stack.

FIG. 4 is a flowchart that shows how the treatment of cache misses is different for the high performance command chip compared to the other chips in the stack. The current settings of the commanding status bits are used by the cache control logic to determine what methods are used to respond to requests to the shared cache. They are also used to determine how lines in the cache are allocated. Thus logically the chips are interconnected via the cache priority logic.

The cache requests originating from the microprocessor cores of the "command" chip will receive priority over the requests originating from the microprocessors of other cores. The data that is the target of these high priority requests will be placed in the cache lines of the high performance chip in its stack. Any cache lines that are aged out of the high performance command chip 200 will be installed elsewhere in the shared cache, in the data cache portions of chips 201,202, 203. The physical interconnection of the chips in a stack allows this data movement to be done very quickly in comparison to prior art designs. A specialized data bus (370) is provided to move data up and down the chip stack 101.

Turning again to FIG. 4, the cache priority logic on the commanding chip of the stack (chip 200 in stack 101 in the preferred embodiment) begins by determining (400) whether there are any requests from the CPUs on the commanding chip which are waiting for access to the cache data (340). If the CPUs on the commanding chip are currently waiting for access then those requests are processed next (440). The directory is accessed at this time. In the preferred embodiment, only the directory of the commanding chip in the stack is active. All requests for access to the shared cache are directed to the command chip. It is the determined (450) whether the request has hit in the shared cache. If a hit is detected, it is then determined (460) whether the target data is physically located in the commanding chip. If the data is located in the commanding chip the data is returned to the requesting CPU (470). If the data is located in another chip on the stack, the data request is forwarded to that chip over one of the direct interfaces within the chip stack (360).

If it is determined (450) that the request missed the shared cache then the request is processed as an off-chip coherency request like it would have been processed in prior-art systems by sending it onto the system bus (480).

Figure 5:
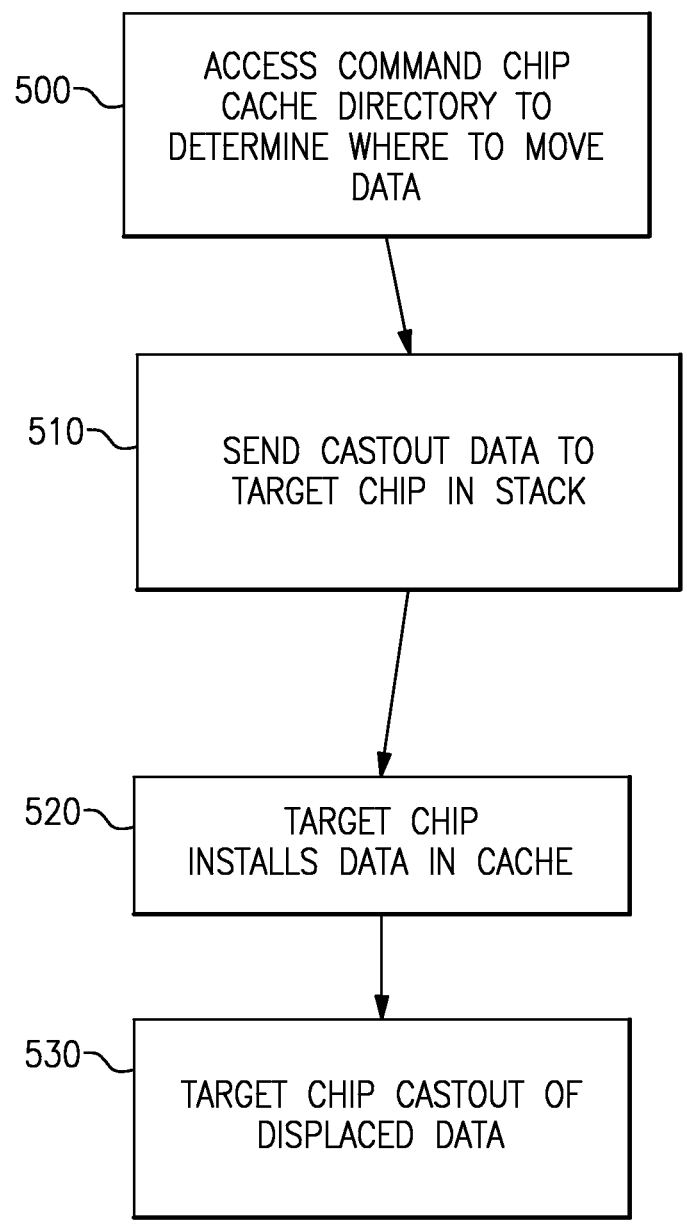
FIG. 5 illustrates data castout of a high performance command chip.

FIG. 5 illustrates data castout of a high performance command chip (200 in stack 101). A castout begins with access to the command chip cache directory to determine where to move data 500. Then identified castout data is sent (501) to a target chip in the stack (101). The target chip in the stack then installs the sent castout data in its cache (502) and the displaced data is castout of the cache of the target chip (530). There are other possible mechanisms for controlling the combined caches of the chips in the stack which may be used to increase the performance of specific workloads.

As one example, one or more aspects of the present invention can be included in an article of manufacture (e.g., one or more computer program products) having, for instance, tangible embodied as code stored on computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided embodied in a physical media.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A multiprocessor system comprising:
a computing system having a plurality of microprocessors for supporting operations of the multiprocessor system arranged in an interconnected stack of microprocessor chips that are designed to work together in stacks of chips in a multiprocessor system,
all of the multiprocessor chips in a stack having the same logical chip design, and the multiprocessor chips are interconnected via cache coherent interconnections between the stacks and controlled by cache coherent priority logic under control of one of said chips being utilized in a stack as a command chip, said command chip controlling at least another of the interconnected stack of microprocessor chips being utilized for optimization of power consumption to provide better performance per Watt of electrical power consumed.

2. The multiprocessor system of claim 1 wherein logically the multiprocessor chips of a stack share a shared cache and are interconnected via the cache priority logic.

3. The multiprocessor system of claim 2 wherein said multiprocessor chips of a stack which share a shared cache and said specialized cache coherent interconnections and current settings of said cache coherent priority logic under control of said command chip determine what methods are used to respond to requests to the shared cache.

4. The multiprocessor system of claim 3 wherein said specialized cache coherent interconnections and current settings of said cache coherent priority logic under control of said command chip determine are also used to determine how lines in the shared cache are allocated.

5. The multiprocessor system of claim 2 wherein the multiprocessor chips of a stack are interconnected with 3D through vias while logically the chips in the stack are interconnected via specialized cache coherent interconnections.

6. The multiprocessor system of claim 2 wherein the multiprocessor chips of a stack are interconnected by compatible package carriers providing the physical interconnections while logically the chips in the stack are interconnected via specialized cache coherent interconnections.

7. The multiprocessor system of claim 1 wherein one or more of the individual microprocessor chips utilized in the stack are implemented in a silicon process that is optimized for high performance while others are implemented in a silicon process that is optimized for reducing power consumption for the best performance.

8. The multiprocessor system of claim 2 wherein current settings for the control priority logic emanate from a hypervisor or operating system written during a power on sequence of the system to control the utilization of individual chips of a stack.

9. The multiprocessor system of claim 2 wherein all of the multiprocessor chips in the stack having the same logical chip design with like processor cores, a cache controller, and a cache directory in each logical chip design, and commanding status bit registers coupled to be written during the power on sequence of the system to identify a particular chip in the stack as a "command" chip or another chip for the stack, and having chip interfaces for coupling the chip to other chips.

10. The microprocessor system according to claim 9 wherein the logical chip design for a single microprocessor chip design is replicated and coupled in a group in the stack to achieve increased performance per watt of power consumed.

11. The microprocessor system according to claim 10 wherein the single processor chip design includes an off-stack interface control for communication with other stacks of chips in the computing system via an interface with logic for said off-stack communication function included in all the chips of a group of the stack but only enabled in the command chip of the stack.

12. The microprocessor system according to claim 10 including a frequency control unit for said single microprocessor chip design that controls the clock frequency for the various components of the chip which uses a setting of the commanding status bits as an input, one setting indicating that the frequency control should set the chip frequency at the high end of the operating range in order to obtain the highest possible performance for the high performance optimization chip, and another setting indicating that the frequency should be set to a lower, power efficient setting.

13. A method of operating a multiprocessor computer system having a stack of interconnected multiprocessor chips coupled in a group in the stack to achieve increased performance per watt of power consumed, comprising:
setting status bits in one of a plurality met said multiprocessor chips to designate said one multiprocessor chip as a command chip whereby the treatment of cache misses is different for the high performance command chip compared to the other chips in the stack, all of which share a cache, and cache requests originating from microprocessor cores of the command chip will receive priority over the requests originating from other microprocessors of the group and data that is the target of high priority requests is placed in cache lines of the high performance chip of the stack, and whereby any cache lines that are aged out of the high performance command chip are installed elsewhere in the shared cache in the data cache portions of chips comprising the stack of multiprocessor chips.

14. The method of claim 13, wherein a d data bus is provided to move data up and down the stack of multiprocessor chips, and cache priority logic on the command chip of the stack begins by determining whether there are any requests from the command chip which are waiting for access to the cache data and if any CPUs on the command chip is currently waiting for access then those requests are processed next and a directory of the command chip which is active is accessed at this time.

15. The method according to claim 13 wherein only the directory of the commanding chip in the stack is active and all requests for access to the shared cache are directed to the command chip.

16. The method according to claim 15 wherein thereafter, it is the determined whether the request has hit in the shared cache and, if a hit is detected, it is then determined whether the target data is physically located in the command chip and if the data is located in the command chip the data is returned to the requesting CPU, but if the data is located in another chip in the stack, the data request is forwarded to that chip over a one of direct interfaces within the chip stack.

17. The method according to claim 15 wherein thereafter, it is the determined whether the request has hit in the shared cache of the microprocessor stack of chips, and, if it is determined that a request missed the shared cache then the request is processed as an off-chip coherency request and sent onto the system bus.

18. The method according to claim 13 wherein a data castout from a high performance command chip in the microprocessor chip stack with access to the command chip cache directory to determine where to move data, and then identified castout data is sent to a target chip in the microprocessor chip stack and the target chip then installs the sent castout data in its microprocessor chip cache.

* * * * *